United States Patent
Weick et al.

(10) Patent No.: US 7,816,621 B2
(45) Date of Patent: Oct. 19, 2010

(54) INTERFACE FOR A LASER PROCESSING HEAD

(75) Inventors: Jürgen-Michael Weick, Asperg (DE); Martin Lambert, Korb (DE)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 1358 days.

(21) Appl. No.: 11/262,601

(22) Filed: Oct. 31, 2005

(65) Prior Publication Data

US 2006/0153668 A1 Jul. 13, 2006

(30) Foreign Application Priority Data

Oct. 30, 2004 (EP) .................... 04025860

(51) Int. Cl.
 *B23K 26/08* (2006.01)
(52) U.S. Cl. .............. 219/121.6; 219/121.67; 219/121.78
(58) Field of Classification Search ........... 219/121.78, 219/121.6, 121.62, 121.67–121.72, 121.83; 414/776
See application file for complete search history.

(56) References Cited

U.S. PATENT DOCUMENTS

| 4,673,329 A * | 6/1987 | Kato ................. 414/744.5 |
| 4,698,480 A * | 10/1987 | Klingel ............... 219/121.67 |
| 5,021,632 A * | 6/1991 | Hauert ................ 219/121.83 |
| 5,160,824 A | 11/1992 | Babel |
| 5,168,610 A | 12/1992 | Ichimura et al. |
| 5,376,061 A | 12/1994 | Suzuki |
| 5,841,098 A * | 11/1998 | Gedrat et al. .......... 219/121.63 |
| 6,393,687 B1 * | 5/2002 | Friedrich .............. 29/560 |
| 6,398,279 B1 * | 6/2002 | Kikut ................. 294/86.4 |
| 2002/0084260 A1 * | 7/2002 | Kubota et al. .......... 219/121.63 |
| 2005/0184038 A1 | 8/2005 | Link et al. |

FOREIGN PATENT DOCUMENTS

| DE | 3410913 | 10/1985 |
| DE | 4040554 | 7/1992 |
| DE | 43 26 254 | 2/1995 |
| DE | 19701516 | 2/1998 |
| DE | 202004004687 | 7/2004 |
| EP | 0 421 117 | 4/1991 |
| EP | 0593783 | 4/1994 |
| EP | 1543915 | 12/2003 |
| GB | 2 071 609 | 9/1981 |
| JP | 04351273 | 12/1992 |
| JP | 2000237874 | 9/2000 |

OTHER PUBLICATIONS

Machine Translation of DE 197 01 516.*
European Examination Report for corresponding European Application No. 04025860.0, mailed Aug. 7, 2007, 4 pages.

* cited by examiner

*Primary Examiner*—Tu B Hoang
*Assistant Examiner*—Brian Jennison
(74) *Attorney, Agent, or Firm*—Fish & Richardson P.C.

(57) ABSTRACT

A material processing machine configured to process a workpiece with a processing head movable with respect to the workpiece, including a workpiece support, a processing head carrier movable with respect to the workpiece support, the carrier including a first half of a releasable head coupling, and a processing head carried by the head carrier and positioned to operably engage a workpiece supported by the support to process the workpiece, the processing head including a second half of the releasable head coupling. The releasable head coupling defines an adjustable head release force.

22 Claims, 4 Drawing Sheets

INTERFACE FOR A LASER PROCESSING HEAD

CROSS-REFERENCE TO RELATED APPLICATIONS

This application claims priority to European Patent Application EP 04025860, filed on Oct. 30, 2004, the entire contents of which are hereby incorporated by reference.

TECHNICAL FIELD

This application relates to devices and methods for mounting a laser processing head on a laser processing machine.

BACKGROUND

A collision protection means for the laser processing head of a laser processing machine including a releasable coupling between the laser processing head and a carrier is described, for example, in DE 197 01 516 C1. In the described device, damage to the machine or workpiece can be prevented in case of a collision between the laser processing head and the workpiece or a device.

SUMMARY

According to one aspect, a method of mounting a processing head on a laser processing machine includes providing a head mounting system that mechanically couples the processing head to the machine, and with the head mounted on the machine, adjusting a coupling strength of the head mounting system, thereby adjusting a force threshold necessary to decouple the head from the machine during material processing. The mounting system defines a head-machine interface across which power is transmitted to the head for material processing. Cooling fluid can also be transmitted across the head-machine interface.

In various embodiments, the processing head includes a laser processing head and/or carries a cutting tool for processing material by direct contact with the material. In some embodiments, the method includes mounting a first processing head on the machine, adjusting the coupling strength to a first level in accordance with a material processing operation associated with the first processing head, replacing the first processing head with a second processing head, and then adjusting the coupling strength to a second level in accordance with a material processing operation associated with the second processing head. The first processing head can be a laser processing head, for examples and the second processing head can carry a cutting tool for processing material by direct contact with the material, for example.

In some embodiments, the force threshold can be configured for pneumatically or electrical adjustment. Adjusting the coupling strength can include reading a memory storage device of the processing head to determine a processing head type.

According to another aspect, a material processing machine is configured to process a workpiece with a processing head movable with respect to the workpiece, and includes a workpiece support, a processing head carrier movable with respect to the workpiece support, the carrier including a first half of a releasable head coupling defining an adjustable head release force, and a processing head carried by the head carrier and positioned to operably engage a workpiece supported by the support to process the workpiece, the processing head comprising a second half of the releasable head coupling.

In various embodiments, the coupling includes multiple coupling pins oriented in different directions and together releasably retaining the processing head to the carrier. The pins can be axially displaceable to release the coupling. The coupling can include adjustable means to resist pin displacement. The head release force can be pneumatically and/or electrically adjustable. The processing head can include a laser processing head that emits a laser beam and/or can carry a cutting tool for processing material by direct contact with the processing material. The machine can also include a set of processing heads such as, for example, a first processing head configured to emit a laser beam and a second processing head carrying a cutting tool for processing material by direct contact with processing material. The head release force can be adjustable to different levels to accommodate sequential processing with both processing heads.

In some embodiments, the coupling connects electrical signal lines to the processing head. The coupling can also connects coolant lines to the processing head. The coupling can connects a data communication bus that transfers data stored in the memory of the processing head. The data can identify a processing function associated with the processing head. The processing head can also include a readable memory.

According to another aspect, an interface for attaching a processing head to a laser processing machine, includes a housing supporting the processing head, a carrier attached to the laser processing machine and comprising couplings for connecting supply lines from the processing machine to the processing head, the carrier configured to the engage the housing of the processing head and a collision protection coupling disposed on the carrier to securably attach the carrier to the housing and to detach the carrier from housing upon application of an adjustable, predetermined force to the processing head.

In additional aspects, a processing head is mounted on a laser processing machine with a collision protection means for releasing the mounting in case of a collision of the processing head, wherein the collision protection elements can adjust the triggering collision force. Depending on the use of the processing head or tool, the collision force can be changed, collision protection can be increased, the mounting can be loosened or the collision protection can be reduced, and the mounting can be reinforced. Laser processing is effected without force while, during mechanical processing such as drilling or milling, a force is exerted on the workpiece. For this reason, collision protection can be triggered more quickly during laser processing than during mechanical processing. Accordingly, the level and type of collision protection can be selectable by the operator, or automatically by the machine.

In some embodiments, any deviation of the laser processing head position from its desired position after a collision can be precisely recognized. It is desirable to allow convenient exchange of the processing head at the interface with the laser processing machine. Some interfaces include the function to mechanically mount the laser cutting head and transfer cutting gases, and comprises a limited collision protection.

In some embodiments, the collision protection permits receipt of differing processing heads or tools. In some other embodiments, the interface permits automatic change of the head and transmits, in addition to the working media, further signals and additional energy, thereby permitting universal use of the tools in a laser machine.

The collision protection elements may have different designs and comprise, for example, mechanical springs, magnets and even gas springs. These means can also be combined to construct simple and at the same time effective collision protection elements. Balls, rolls or rollers can be used for example, as contact means between the collision protection elements and corresponding counterparts of the processing head to facilitate release of the connection in case of collision.

Other features and advantages will be apparent from the description, the drawings, and the claims.

DETAILED DESCRIPTION

Figure 1:
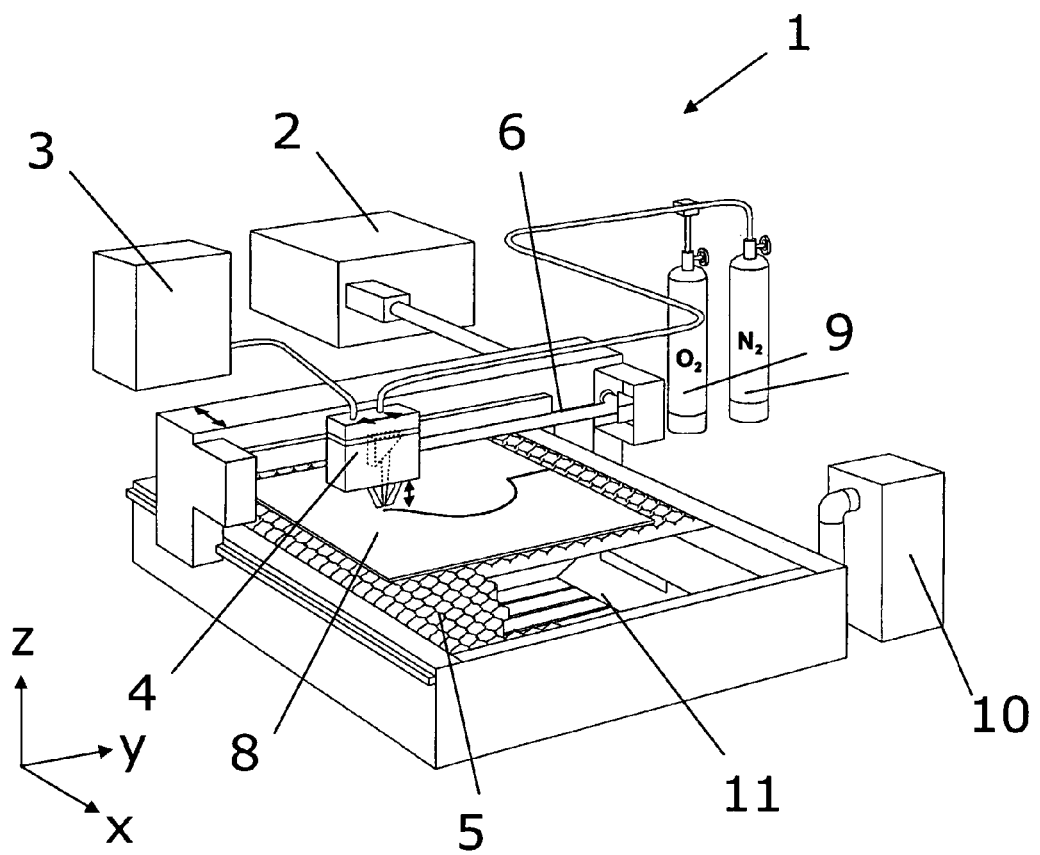
FIG. 1 shows a perspective view of a laser processing system.

FIG. 1 shows the fundamental construction of a laser processing system 1 for laser cutting using a $CO_2$ laser 2, a control means 3, a laser processing head 4 and a workpiece support 5. A generated laser beam 6 is guided to the laser processing head 4 using deflecting mirrors, and is directed onto a workpiece 8.

In some embodiments, the laser beam 6 penetrates through the workpiece 8 to produce a continuous kerf. The sheet metal 8 can be spot-wise melted or oxidized and the molten mass must be blown out. The piercing process may be performed rapidly (i.e. using the full laser power) or slowly (via a so-called "ramp").

In case of slow piercing using a ramp, the laser power can be gradually increased, reduced and be kept constant for a certain time period until the piercing hole is generated. Piercing and also laser cutting are supported by adding a gas. The cutting gas 9 may be oxygen, nitrogen, pressurized air and/or application-specific gases. Which gas is eventually used depends on the materials to be cut and on the required quality of the workpiece. Cutting with oxygen is usually performed using a gas pressure of maximally 6 bars. The material is molten and largely oxidized at the location where the laser beam 6 meets the sheet metal 8. The produced molten mass is blown out together with the iron oxides. The particles and gases produced can be suctioned out of a suction chamber 11 using a suction means 10. During oxidation (exothermal reaction) additional energy is released which promotes the cutting process. If oxygen is used as cutting gas for a material thickness which permits use of the same laser power for oxygen cutting as well as nitrogen high-pressure cutting, the processing cutting speeds may be considerably higher or the material thickness to be cut may be larger compared to nitrogen.

Figure 2A:
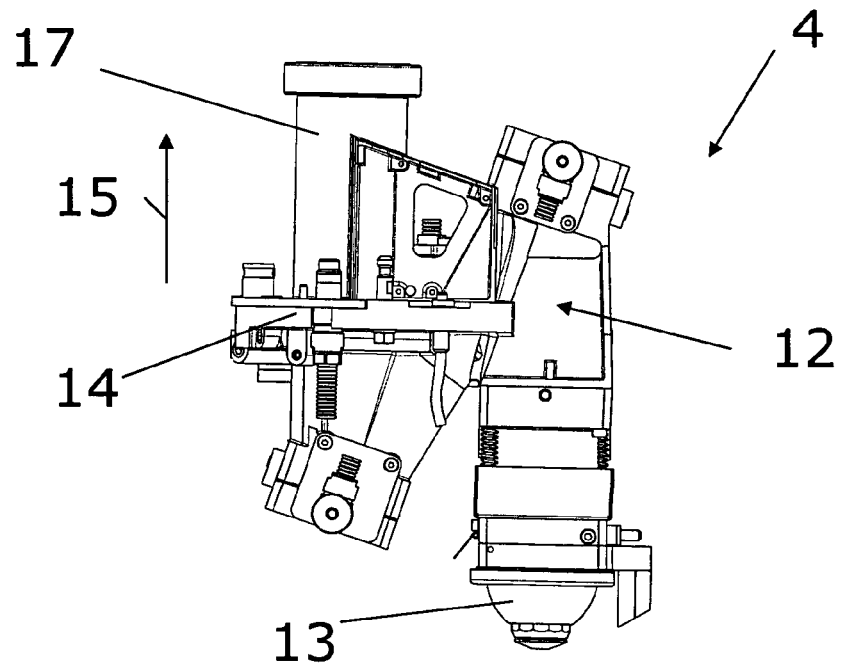
FIG. 2a shows a side view of a laser cutting head of the laser processing system.

As shown in FIG. 2a, the laser processing head 4 includes a housing 12 which accommodates a laser optics for deflecting and focusing the laser beam to permit exit of a focused laser beam through a laser processing nozzle 13 in the direction of the workpiece. The laser processing head 4 is mounted via a housing section 14. The mounting direction H of the housing section 14 extends in a vertical direction to permit replacement of the head through a motion along the Z axis. All signals, auxiliary energies and media such as gas connections and cooling water connections are also coupled in this direction H. Collision protection is also provided in the interface which can be equally triggered in the X, and Y and Z directions. In case of collision of the laser processing head 4 with an obstacle, processing is stopped and the laser processing head 4 can be released from its carrier and be held by corresponding auxiliary means.

Figure 2B:
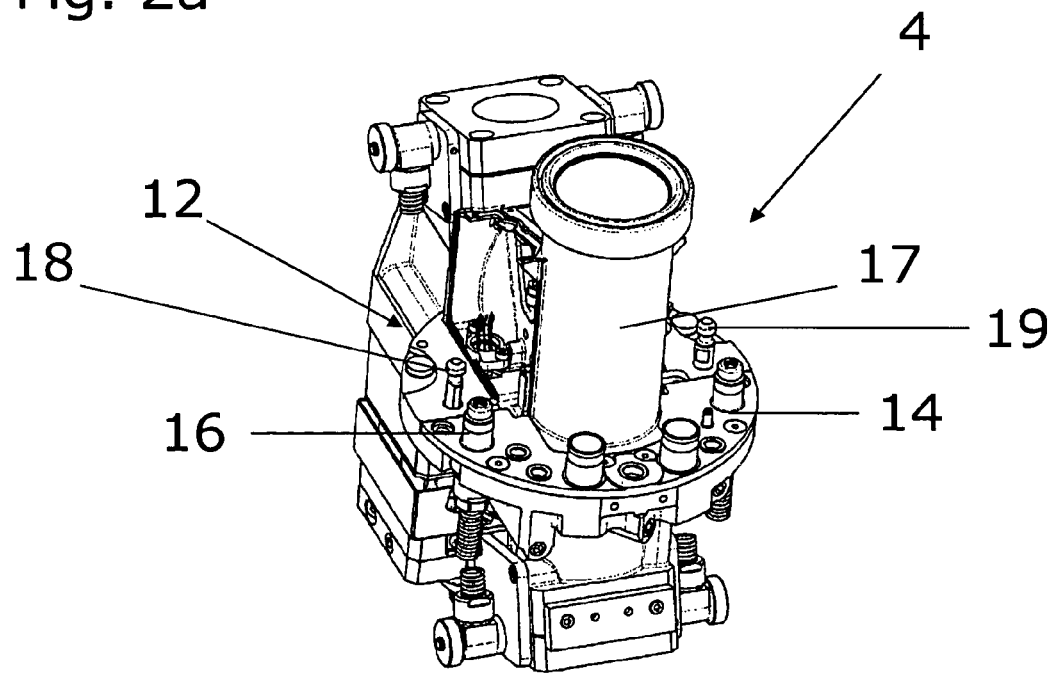
FIG. 2b shows a perspective view of the laser cutting head of the laser processing system.
Figure 3:
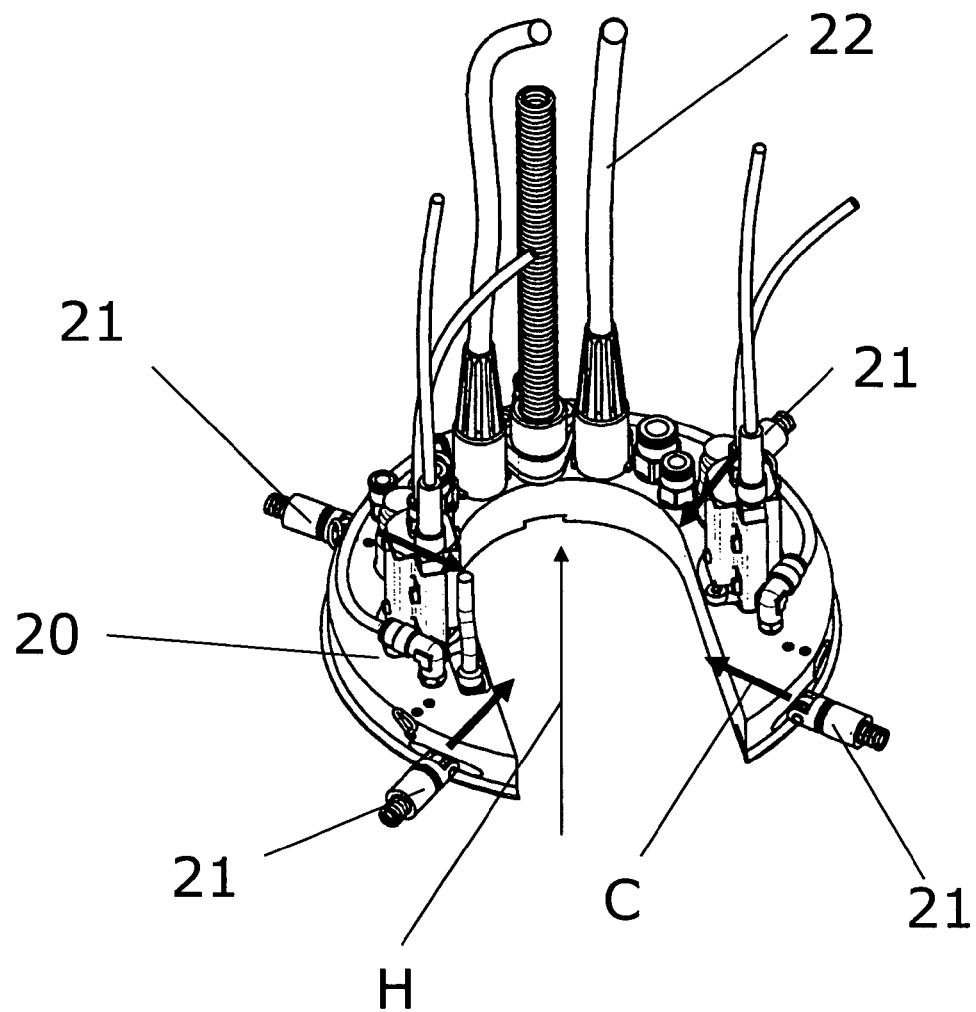
FIG. 3 shows a perspective view of the mounting of the laser cutting head on the laser processing system.

FIG. 2b shows a coupling 16 for the signal lines, the energy supplying cables and gas and water leads. The housing section 14 to be coupled to a carrier surrounds a cylindrical shielding 17 of the laser beam like a horseshoe. The developed collision protection means comprises clamping bodies 18 and 19 which, in the fixed state of the laser processing head 4, are held under pressure by collision protection elements, thereby forming a clamping connection. The housing section 14 can be coupled to the carrier 20 in accordance with FIG. 3, on which the collision protection elements 21 are disposed. The housing section 14 and carrier 20 provide on the one hand the connection to lines or cables 22 for signals, auxiliary energies and media such as gas and cooling water, and on the other hand collision protection. The interface has the function of mechanical mounting of the laser processing head and transferring working gases and coolants, and comprises a collision protection.

The collision protection elements 21 are disposed via the carrier 20 at an angle of approximately 90° relative to each other, each comprising a roll for abutment on a clamping body of the housing part of the laser processing head with adjustable pre-tension. The pressurization or tensioning of the clamping bodies on the housing section 14 is indicated by arrows C in accordance with the collision protection elements 21 and acts transversely to the mounting direction H of the processing head.

Figure 4A:
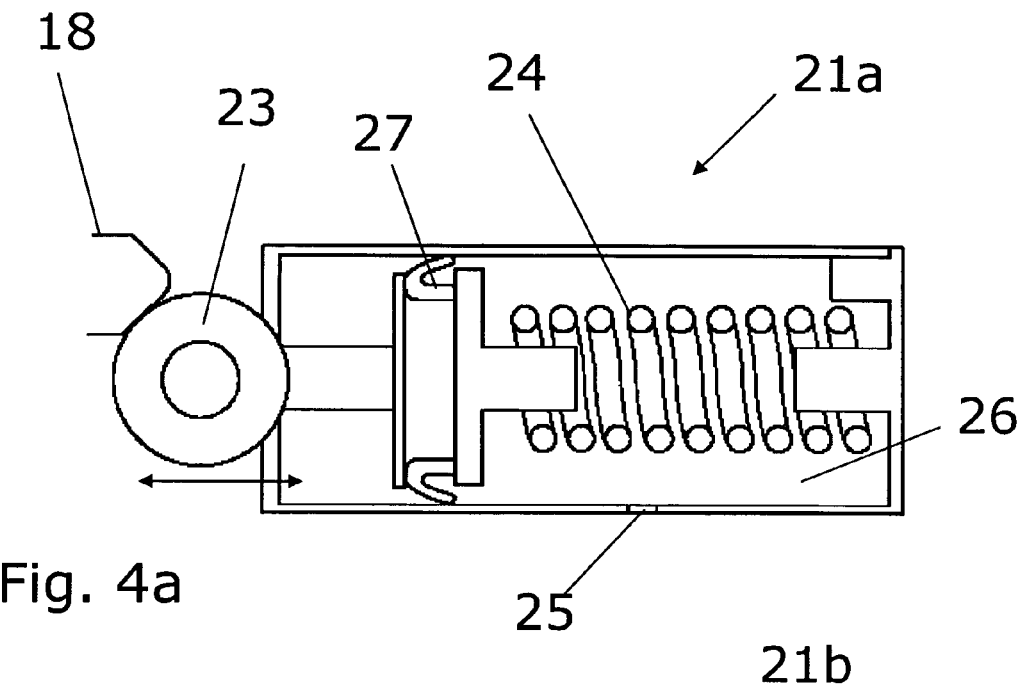
FIG. 4a shows a sectional view of one embodiment of a collision protection element of the mounting.

FIG. 4a shows a collision protection element 21a according to one embodiment including a roll 23 which is tensioned on the clamping body 18 of the housing section 14 through a mechanical pressure spring 24 and a gas supplied through an inlet opening 25. A spring chamber 26 can be filled with gas up to a plastic seal 27 to pneumatically support the mechanical spring force. The roll 23 is connected to a pressure plate against which a pressure is exerted by the pressure spring 24. If a collision occurs in X, Y or Z direction with a force which is larger than the spring force of the pressure spring 24, the pressure spring 24 is compressed (see arrow), the roll 23 can be forced back and an inclined abutment surface on the clamping body 18 can slide on the roll 23. Mounting of the processing head on the carrier is released.

Figure 4B:
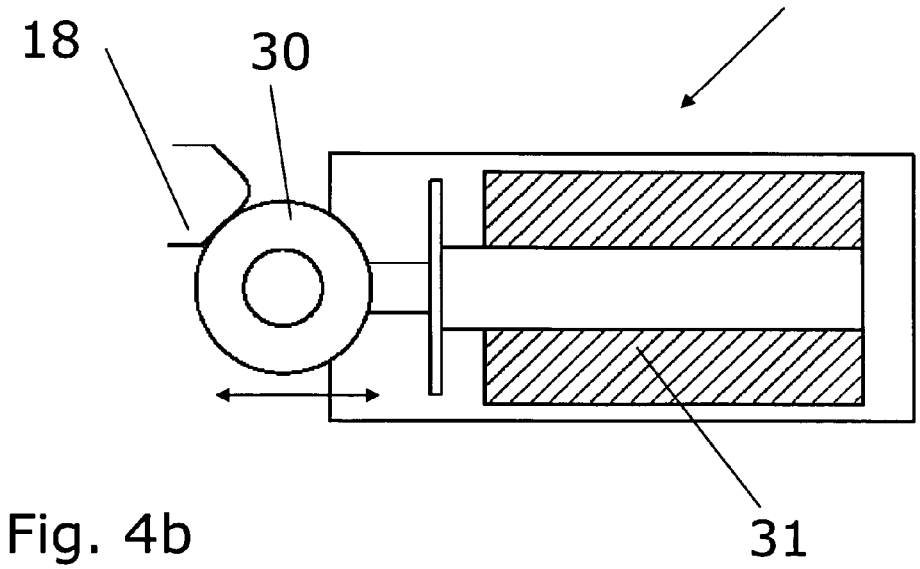
FIG. 4b shows a sectional view of another embodiment of a collision protection element.

FIG. 4b shows another embodiment of a collision protection element 21b including a roll 30 which is tensioned on the clamping body 18 of the housing section 14 through a magnet 31 and a bolt held by the magnet 31 and indirectly acting on the roll 30 via a pressure plate. The roll 30 is connected to the pressure plate against which the bolt held by the magnet 31 is pressed. Magnet 31 may be an electro-magnet, for example. A solenoid coil may also be employed. In case of a collision in the X, Y or Z direction with a force which is larger than the magnetic holding force, the bolt is pushed back, the roll 30 can be forced back (see arrow) and the inclined abutment surface on the clamping body 18 can slide on the roll 30. Mounting of the processing head on the carrier is released.

The hardness or reinforcement of the collision protection can be selected by the adjustable magnetic force or the adjustable spring force. Depending on the processing of the workpiece, a holding force or triggering of the collision protection can be predetermined. This permits mounting of the most different processing heads and automatic processing head exchange. In some embodiments, the laser processing head includes a storage chip with its data.

This universal laser processing system can perform several tasks during one process. Communication with the control is provided via a separate bus. The following processing functions are feasible: laser welding, laser cutting, measuring with a feeler head or optical measuring head, threading with thread cutting spindle, engraving (with milling cutter), milling/deburring/brushing, introduction of standard parts from a magazine in laser-cut recesses, welding of bolts, removal or sorting of individual components, applying letters/numbers/symbols, labeling, painting/varnishing and subsequent burning-in with the laser, applying a protective film on the writing from which the final paint or varnish can be removed, shaping (with suitable auxiliary tools), material analysis (spectrometer), surface inspection of the workpiece.

Other implementations are within the scope of the following claims.

LIST OF REFERENCE CHARACTERS 1 laser processing system
2 laser
3 control means
4 laser processing head
5 workpiece support
6 laser beam
8 workpiece
9 cutting gas
10 suction chamber
11 suction means
12 housing
13 laser processing nozzle
14 housing section
16 coupling
17 shielding
18 clamping body
19 clamping body
20 carrier
21a, 21b collision protection elements
22 line or cable
23 roll
24 pressure spring
25 inlet opening
26 spring chamber
27 seal
30 roll
31 magnet
H mounting direction of the housing section
C direction of pressurization or tensioning of the clamping bodies on the housing part

What is claimed is:

1. A method of mounting different processing heads on a processing machine to provide collision protection for the processing heads, the method comprising:
   providing a head mounting system that mechanically couples a processing head to the machine, the head mounting system defining a head-machine interface across which power is transmitted to the head for material processing, and comprising collision protection means that comprise multiple coupling pins oriented in different directions and together releasably retaining the processing head and that release the processing head from the machine in case of a collision of the processing head;
   mounting a first processing head on the machine;
   with the first processing head mounted on the machine, adjusting a coupling strength of the collision protection means in the head mounting system to a first level in accordance with a material processing operation associated with the first processing head, thereby adjusting a force threshold necessary to decouple the first processing head from the machine in the event of a collision of the processing head during material processing;
   replacing the first processing head with a second processing head; and then
   adjusting the coupling strength to a second level in accordance with a material processing operation associated with the second processing head.

2. The method of claim 1, wherein the coupling strength is adjusted to accommodate a laser processing head.

3. The method of claim 1, further comprising transmitting cooling fluid across the head-machine interface.

4. The method of claim 1, wherein the coupling strength is adjusted to accommodate a processing head that carries a cutting tool for processing material by direct contact therewith.

5. The method of claim 1, wherein the coupling strength at the first level is adjusted to accommodate a laser processing head, and wherein the coupling strength at the second level is adjusted to accommodate a processing head that carries a cutting tool for processing material by direct contact therewith.

6. The method of claim 1, wherein the force threshold is adjusted pneumatically.

7. The method of claim 1, wherein the force threshold is adjusted electrically.

8. The method of claim 1, wherein adjusting the coupling strength includes reading a memory storage device of the processing head to determine a processing head type.

9. A material processing machine configured to process a workpiece with a number of different processing heads that are movable with respect to the workpiece, the machine comprising:
   a workpiece support;
   a set of at least first and second processing heads; and
   a processing head carrier that is movable with respect to the workpiece support, the carrier comprising a first half of a releasable head coupling and comprising collision protection elements that comprise multiple coupling pins oriented in different directions and together releasably retain a processing head to the carrier and release the processing head from the carrier in case of a collision of the processing head;
   wherein the processing head is carried by the head carrier and positioned to operably engage a workpiece supported by the workpiece support to process the workpiece; wherein the processing head comprises a second half of the releasable head coupling comprising collision protection means; wherein at least one of the first and second halves of the releasable head coupling provides an adjustable head release force that enables the processing head to be released from the material processing machine in the event of a collision of the processing head; and wherein the head release force is adjustable to different levels to accommodate sequential processing operations with the first and second processing heads.

10. The machine of claim 9, wherein the pins are axially displaceable to release the coupling.

11. The machine of claim 10, wherein the coupling includes adjustable means to resist pin displacement.

12. The machine of claim 9, wherein the head release force is pneumatically adjustable.

13. The machine of claim 9, wherein the head release force is electrically adjustable.

14. The machine of claim 9, wherein the first or second processing head comprises a laser processing head that emits a laser beam.

15. The machine of claim 9, wherein the first or second processing head carries a cutting tool for processing material by direct contact therewith.

16. The machine of claim 9, wherein the first processing head is configured to emit a laser beam; and the second processing head carries a cutting tool for processing material by direct contact therewith.

17. The machine of claim 9, wherein coupling the processing head to the processing head carrier connects electrical signal lines to the processing head.

18. The machine of claim 9, wherein coupling the processing head to the processing head carrier connects one or more coolant lines to the processing head.

19. The machine of claim 9, wherein the processing head comprises a readable memory.

20. The machine of claim 19, wherein coupling the processing head to the processing head carrier connects a data communication bus that transfers data stored in the memory of the processing head.

21. The machine of claim 20, wherein the data identifies a processing function associated with the processing head.

22. The machine of claim 9, wherein the processing head carrier further comprises couplings for connecting supply lines from the processing machine to the processing head.

* * * * *